Sept. 8, 1970 TAKANORI HONOBE ET AL 3,527,893

AUTOMATIC ANSWERING APPARATUS FOR A TELEPHONE WITH A SINGLE RELAY

Filed Nov. 30, 1967

3 Sheets-Sheet 1

Takanori Honobe
Yoichi Hayakawa
INVENTORS

BY George B. Oujevolk
Attorney

BY Takanori Honobe
Yoichi Hayakawa
INVENTORS
George B. Oujevolk
Attorney

Takanori Honobe
BY Yoichi Hayakawa
INVENTORS
George B. Oujevolk
Attorney

United States Patent Office 3,527,893
Patented Sept. 8, 1970

3,527,893

AUTOMATIC ANSWERING APPARATUS FOR A TELEPHONE WITH A SINGLE RELAY

Takanori Honobe and Yoichi Hayakawa, Tokyo, Japan, assignors to Crown Radio Corporation, Tokyo, Japan, a corporation of Japan Filed Nov. 30, 1967, Ser. No. 686,874
Claims priority, application Japan, Feb. 21, 1967, 42/13,870; Feb. 23, 1967, 42/14,519; Mar. 31, 1967, 42/26,629
Int. Cl. H04m *11/10*
U.S. Cl. 179—6 3 Claims

ABSTRACT OF THE DISCLOSURE

A control tape recorder is provided with an endless tape which has stored the absentee's automatic answers recorded in advance, and to a part of which is attached a metal electrode foil. The endless tape which has been set in motion is so designed as to stop by means of the metal electrode foil each time it completes one rotation, thereby limiting the duration of the caller's message.

BACKGROUND OF THE INVENTION

The present invention relates to an automatic answering apparatus for a telephone and more particularly to an automatic answering apparatus for a telephone using an endless tape so as to regulate the duration of the caller's message.

In recent years, a variety of automatic devices for telephone have been developed automatically to respond to calling bell signals, where the answering apparatus for telephone user happens to be absent and to record the particulars of the caller's message.

Heretofore, the aforesaid type of automatic answering apparatus for telephone actuated a tape recorder in response to the calling bell signals to record the caller's message. However, with the prior art tape recorder, recording was continued until the receiver was automatically returned to its original position on the telephone body upon completion of the caller's message. Hence the caller tended to speak rather leisurely or verbosely, so that such prolonged message often resulted in the wasteful use of a recording tape.

SUMMARY OF THE INVENTION

The object of the present invention is to provide an automatic answering apparatus for a telephone, wherein a control tape recorder is provided with an endless tape which has stored the absentee's automatic answers recorded in advance, and to a part of which is attached a metal electrode foil, and the endless tape is caused to stop by means of the metal electrode foil, each time it completes one rotation thereby to restrict the duration of the caller's message so that a recording tape may be used effectively and economically.

According to the present invention, there is obtained an automatic answering apparatus for a telephone which comprises a telephone pickup means disposed close by the receiver section of a telephone to detect calling bell signals and pick up the caller's message; a switching circuit connected to the telephone pickup means to actuate a relay in response to the calling bell signal; a control tape recorder connected to a speaker positioned adjacent to the receiver mouthpiece to operate by the actuation of the relay; an endless tape fitted to the control tape recorder which has stored the absentee's automatic answers recorded in advance and has a metal electrode foil fixed to a part thereof to stop the operation of the relay; another tape recorder actuated by the relay to store the caller's message detected by the pickup means; and an answering and connecting attachment including a plunger mechanism mounted on the telephone body to lift the receiver thereof by the actuation of the relay so as to set the telephone in an "On" condition.

DETAILED DESCRIPTION OF THE INVENTION

Figure 1:
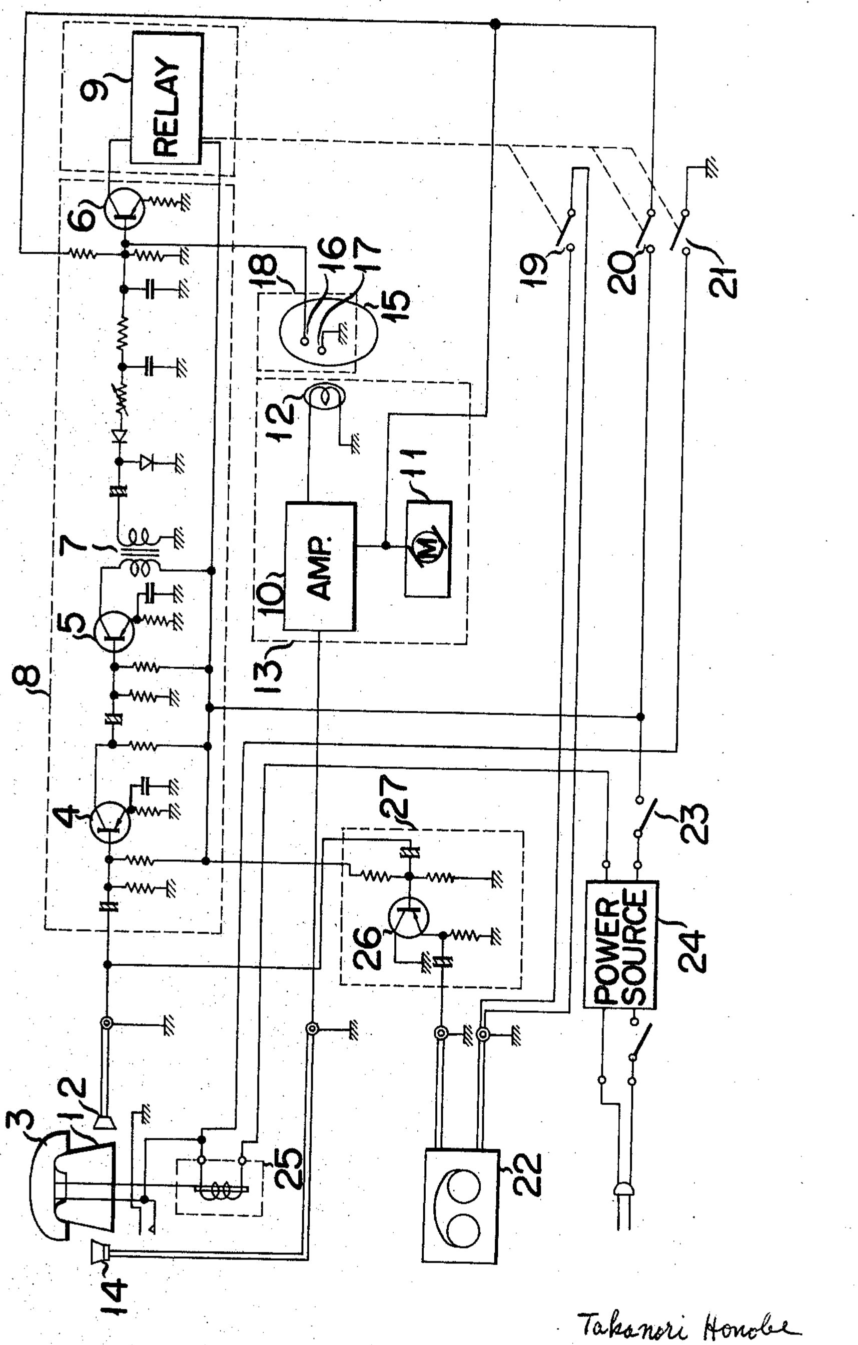
FIG. 1 is a circuit diagram of the entire system according to one embodiment of the present invention.

Referring to FIG. 1, there is provided adjacent to a telephone body 1 in common use a telephone pickup means 2 to detect calling bell signals and pick up the caller's message. The telephone pickup means may consist of an electromagnetic pickup disposed near the mouthpiece of the receiver 3 attached to a telephone body 1 and electromagnetically connected to a sound coil provided within the mouthpiece or a microphone to actuate in response to the calling bell sounds on the caller's voices.

Connected to the output side of the telephone pickup means 2 is the input terminal of a switching circuit 8 including transistors 4, 5 and 6 and a transformer 7, the output terminal of the switching circuit 8 being connected to a relay 9.

Part of the output from the switching circuit 8 is conducted to a control tape recorder 13 containing an amplifier 10, a motor 11 and a magnetic head 12, and the output from the control tape recorder 13 is transferred through an amplifier to a speaker 14 positioned near the mouthpiece of the receiver 3. The control tape recorder 13 comprises an endless magnetic tape 15 as schematically shown. Disposed near the endless tape 15 is a control signal detecting section 18 wherein a first contact member 16 connected to the base side of the transistor 6 and a second grounded contact member 17 are slidably arranged in the later-described positional relationship with respect to the electrode foil.

The relay 9 has three normally open contacts 19, 20 and 21. The contact 19 is connected in series to the power source circuit (not shown) of the tape recorder 22 for storage of the caller's message, the contact 20 is connected through a switch 23 to one of the output terminals of the power source circuit 24 on one hand and the switching circuit 8 on the other, and the contact 21 is connected to one end of the electromagnetic coil of the later-described answering and connecting attachment including a plunger mechanism as well as to the ground. The switch 23 is used in changing the method of giving the absentee's answers to the caller from the usual personal conversation to the automatic answering system or vice versa. The other end of the electromagnetic coil of the plunger mechanism is connected to the other of the output terminals of the power source circuit 24. Furnished to the recording input terminal of the tape recorder 22 for storage of the caller's message is part of the output from the telephone pickup means 2 through a buffer circuit 27 including the transistor 26. The contact 19 is also used as a contact for the self maintenance of the relay 9, though the circuit for this purpose is not shown.

Figure 2A:
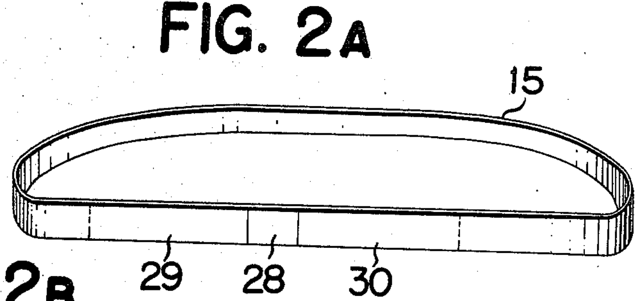
FIG. 2A shows a form of control magnetic tape used in the invention.

The endless tape 15 has an electrode foil 28 to control the duration of the caller's message as shown in FIG. 2A. On both sides of the electrode foil 28 are provided tape strips 29 and 30 which have stored the absentee's automatic answers recorded in advance. The remainder of the endless tape is of such length as will correspond to the length of the caller's message which will be set for recording on the tape recorder 22 for storage purposes. When the control tape recorder 13 is operated to give the absentee's automatic answers there will be reproduced upon the rotation of the endless tape the absentee's first answer stored in the tape strip 29, meaning, for example, "though the answerer is now absent, preparation has been made for recording and so the caller is kindly requested to commence his message." This absentee's first reply will be transmitted from the speaker 14 through the rceeiver mouthpiece to the caller. The caller's message given in response to this will then be detected by the telephone pickup means 2 and stored on the tape recorder 22. During the time of recording the endless tape 15 is, of course, continued in motion. Therefore when the tape strip 30 reaches a sounding mechanism during the rotation of the endless tape there will be again transmitted to the caller the absentee's second answer stored in said tape strip 30, worded, for example, as "since the prescribed recording time will run out very soon, say, in a minute, the caller is kindly requested to end up his remark briefly."

Figure 2B:
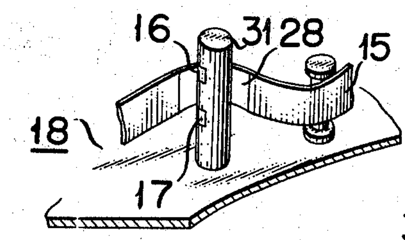
FIG. 2B is a schematic representation of the construction of one form of control signal detecting section.

Thus after the lapse of the prescribed recording time, the electrode foil 28 attached to the endless tape 15 is conducted to the control signal detecting section 18 shown in FIG. 2B. When the electrode foil is further carried to the point at which first and second contact members 16 and 17 are mounted on a guide post 31, these first and second contact members 16 and 17 are shorted with each other by the electrode foil 28 and the input side of the transistor 6 is grounded. As this occurs, the current supplied to the relay 9 is cut off to release it out of the self-maintaining position and the contacts 19 and 21 which are normally open are restored to their original state. Thereupon the control tape recorder 13 and the tape recorder 22 for storage purposes stop their operation. On the other hand, the endless tape which still keeps on running at this time due to inertia stops its motion when the electrode foil 28 has completely passed the contact members 16 and 17, therefore presenting no difficulties in the next operation.

When a telephone 1 receives a calling bell signal, it is detected by the telephone pickup means 2 and electric current flows through the switching circuit 8 to the relay 9 to close the contacts 19 to 21. As mentioned above, the contact 19 has a combined use as the power source switch of the tape recorder 22 and also for the self maintenance of the relay 9. Therefore, once the contact 19 is closed, the relay is kept in an operable condition, though the calling bell signal is disconnected. The closing of the contacts 20 and 21 causes electric current to be supplied to the magnetic coil of the answering and connecting attachment 25 to operate the plunger of the plunger mechanism involved in said attachment, lift the receiver 3 and set the hook switch (not shown) contained in the telephone body in an "On" condition.

Figure 3:
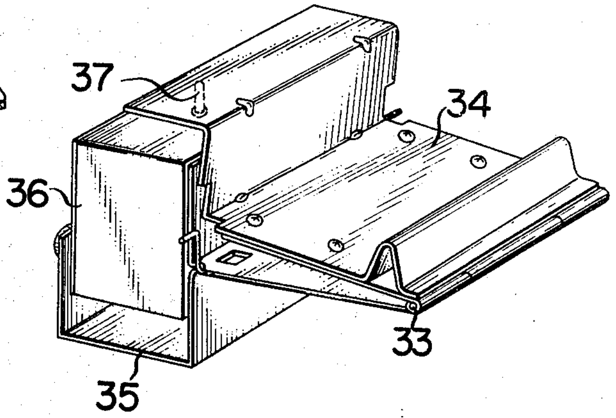
FIG. 3 is a schematic perspective view of one form of an answering and connecting attachment including a plunger mechanism according to the present invention.

The answering and connecting attachment 25 comprises, as illustrated, for example, in FIG. 3, an upper board 34 and a base board 35 bent in the crank form, which are fitted together at one end in a hinged relationship by an axle 33 and a plunger mechanism 36 mounted on the base board 35 containing a plunger 37. While the upper board 34 and the base board 35 may be composed of metal or synthetic resin, it is preferred that the upper board be made of as light material as possible due to the necessity of being lifted by the plunger mechanism 36.

Figure 4:
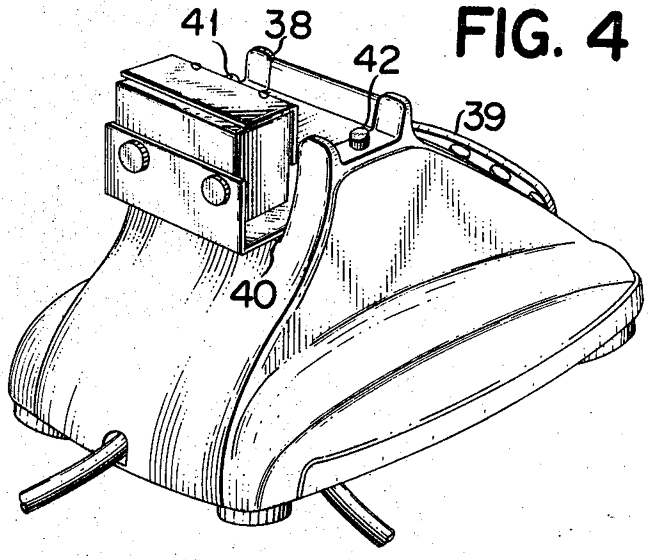
FIG. 4 is a perspective view of the answering and connecting attachment fitted to a telephone body.

The answering and connecting attachment 25 of the aforementioned construction can be easily fitted to the telephone body 1 in common use as shown in FIG. 4. Namely, the answering and connecting attachment 25 is mounted on the telephone body 1 in such a manner that the aforesaid upper and base boards of said attachment which are connected to each other by the axle 33 are disposed on the side of the dial 39 with respect to the finger board 38 of the telephone body 1 and that the crank-like bend of the base board 35 on which the plunger mechanism is mounted is engaged with the stepped section between the finger board 38 and the cavity 40.

Figures 5A, 5B:
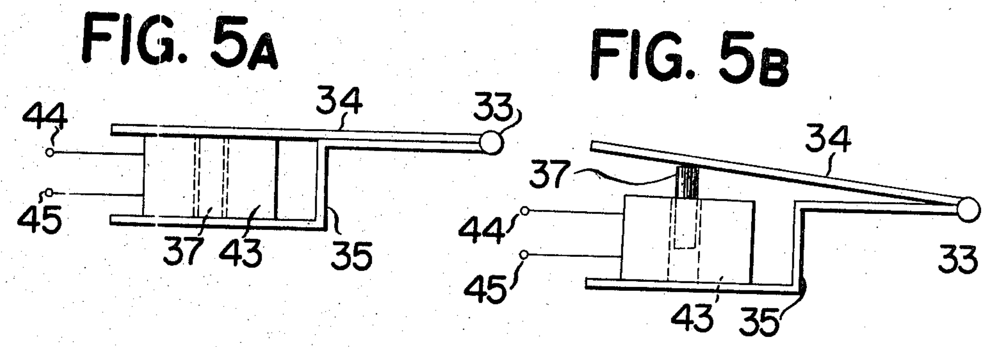
FIGS. 5A and 5B illustrate the mechanism of the answering and connecting attachment.

As described above, when there is no calling bell signal, the plunger 37 does not operate as shown in FIG. 5A, and consequently the receiver does not release upward the push buttons 41 and 42 of the hook switch so that said switch is kept disconnected. However, when a calling bell signal is received, electric current is introduced into the electromagnetic coil 43 of the plunger mechanism 37 through the terminals 44 and 45 as illustrated in FIG. 5B. Then the plunger 37 lifts the upper board 34 and as a consequence the receivers to set "On" the hook switch. When this switch is set "On" the aforementioned automatic answering operation is carried out.

Figure 6:
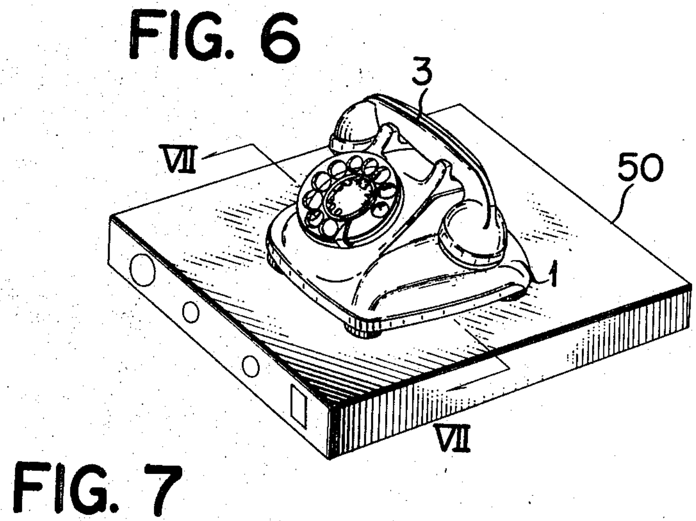
FIG. 6 is a perspective view of another form of the pickup means shown at 2, FIG. 1.
Figure 7:
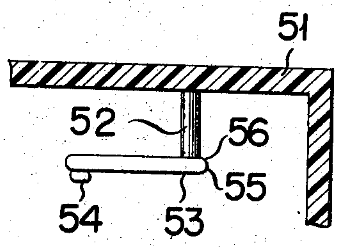
FIG. 7 is a schematic sectional view taken on line VII—VII in FIG. 6.

The answering and connecting attachment of the present invention may be housed in an adaptor 50 as shown in FIG. 6 and the telephone body 1 may be placed directly on said adaptor 50. Under such condition, the mechanical vibrations caused by the calling bell sounds are transmitted directly to the adaptor 50, so that utilizing these vibrations, a piezoelectric element having a direct piezoelectric effect may be employed in detecting the bell sounds in place of the pickup means 2 shown in FIG. 1. Referring now to FIG. 7, the underside of the upper board 51 of the adaptor 50 is fitted with a supporting member 52 projecting downward therefrom substantially vertically as illustrated, and to the lower end of the supporting member 52 there is fitted on end of a piezoelectric element 53 made, for example, of barium titanate ($BaTiO_3$) having a direct piezoelectric effect. Also to the other end of the piezoelectric element 53 there is fixed a weight 54, which operates to maintain the vibrations of the piezoelectric element in equilibrium when they take place. The piezoelectric element is provided with output terminals 55 and 56, which are connected to the switching circuit 8 (not shown) provided within the adaptor 50.

Figure 8:
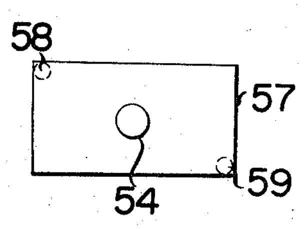
FIG. 8 is a plane view of another form of a piezoelectric element having a direct piezoelectric effect as shown in FIG. 7.

Up to this point, there has been described a piezoelectric element 53 having a supporting member 50 fitted to one end thereof and a weight fixed to the other. However, as shown in FIG. 8, it may, of course, be permissible to attach a weight 54 to the substantially central part of a rectangular piezoelectric element and fit a supporting member (not shown) to both ends 58 and 59, respectively, on one of the diagonal lines of the piezoelectric element 57.

While the invention has been described in connection with some preferred embodiments thereof, the invention is not limited thereto and includes any modifications and alternations which fall within the true spirit and scope of the invention as defined in the appended claims.

What is claimed is:

1. An automatic answering apparatus for a telephone comprising in combination:

(a) telephone pickup means (2) which can be placed close to a telephone to detect calling signals and receive messages from callers;

(b) a switching circuit arrangement (8) connected to the telephone pickup means including amplifier means (10) for amplifying said signals and messages and a relay (9) with three normally open contacts (19, 20, 21) actuated in response to the ringing of the telephone bell;

(c) a first tape recorder (13) including a speaker (14) disposed adjacent to the telephone mouthpiece which is operated by the closing of one of said contacts when the relay is actuated;

(d) an endless narrow tape (15) with a narrow metal electrode foil (28) disposed along a first location thereon to open said relay, with an answer recorded at a second location thereon in the proximity of said first location, the length of the remainder of the tape being such as to allow a caller to make a response limited to the balance of the running time of said tape;

(e) a second tape recorder (22) operated by the closing of a second of said normally open contacts by actuation of the relay to store the caller's message detected by the pickup means; and (f) an answering and connecting attachment (25) mounted on the telephone to lift the hand-set thereof by the closing of the third of said normally open contacts at the actuation of the relay so as to place the telephone in a receiving condition.

2. An automatic answering apparatus as claimed in claim 1, including relay opening means including said metal electrode foil disposed at said first location, together with a guide post having a side face and at least two contact members spacially positioned on said side face, a circuit being formed as said electrode foil engages said contact members and opens said relay.

3. An automatic answering apparatus as claimed in claim 1, wherein said telephone pickup means comprises a piezoelectric element fitted by a supporting member to an adapter on which the telephone is mounted so as to convert mechanical vibrations caused by the bell signals and caller's message to electric signals and a weight fixed to a part of the piezoelectric element to balance the vibrations of the piezoelectric element when they occur.

References Cited

UNITED STATES PATENTS

| | | | |
|---|---|---|---|
| 2,533,234 | 12/1950 | Edwards | 179—6 |
| 2,670,403 | 2/1954 | Mack | 179—6 |
| 3,127,474 | 3/1964 | Weldman | 179—6 |
| 3,296,382 | 1/1967 | Klumb | 179—6 X |

OTHER REFERENCES

Spratt: "Simple Telephone Answering Machine," Wireless World, July 1956, pp. 344–346.

TERRELL W. FEARS, Primary Examiner

R. F. CARDILLO, Jr., Assistant Examiner